(12) United States Patent
Joachim et al.

(10) Patent No.: US 10,073,596 B2
(45) Date of Patent: Sep. 11, 2018

(54) METHOD AND DEVICE FOR OPERATING AN ELECTRONIC UNIT AND/OR OTHER APPLICATIONS

(75) Inventors: Manuel Joachim, Hannover (DE);
Michael Mischke, Hannover (DE);
Michael Wittkämper, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 195 days.

(21) Appl. No.: 14/239,347

(22) PCT Filed: Aug. 4, 2012

(86) PCT No.: PCT/EP2012/003336
§ 371 (c)(1),
(2), (4) Date: Apr. 9, 2014

(87) PCT Pub. No.: WO2013/023752
PCT Pub. Date: Feb. 21, 2013

(65) Prior Publication Data
US 2014/0282249 A1 Sep. 18, 2014

(30) Foreign Application Priority Data
Aug. 18, 2011 (DE) .................. 10 2011 110 974

(51) Int. Cl.
*G06F 3/048* (2013.01)
*G06F 3/0484* (2013.01)
(Continued)

(52) U.S. Cl.
CPC .......... *G06F 3/04842* (2013.01); *G06F 3/017* (2013.01); *G06F 3/04817* (2013.01);
(Continued)

(58) Field of Classification Search
None
See application file for complete search history.

(56) References Cited

U.S. PATENT DOCUMENTS 8,098,879 B2 * 1/2012 Murayama ............... A63F 13/10
358/3.28
2004/0119763 A1 * 6/2004 Mizobuchi .......... G06F 3/04883
715/863
(Continued)

FOREIGN PATENT DOCUMENTS

| CN | 101046717 A | 10/2007 |
|---|---|---|
| CN | 101673176 A | 3/2010 |

(Continued)

OTHER PUBLICATIONS

Search Report for German Patent Application No. 10 2011 110 974.2; Sep. 21, 2012.
(Continued)

*Primary Examiner* — William C Trapanese
(74) *Attorney, Agent, or Firm* — Barnes & Thornburb LLP

(57) ABSTRACT

A method for the operator control of at least one electronic device and/or application on a display device 10, for example in a motor vehicle, in which a plurality of selectable objects are presented, wherein the objects are displayed spatially in a two-dimensional landscape and are automatically filtered and/or sorted by a preselection with a gesture in front of or on the display device. Also disclosed is a device for carrying out the method having a display device, a touchpad, a processing device, a control device for gesture and handwriting recognition, and a memory for filtering and/or sorting a plurality of selectable objects.

9 Claims, 5 Drawing Sheets

(51) Int. Cl.
*G06F 17/30* (2006.01)
*G06F 3/01* (2006.01)
*G06F 3/0481* (2013.01)
*G06F 3/0488* (2013.01)

(52) U.S. Cl.
CPC .... *G06F 3/04883* (2013.01); *G06F 17/30032* (2013.01); *G06F 17/30061* (2013.01)

(56) References Cited

U.S. PATENT DOCUMENTS

| | | |
|---|---|---|
| 2006/0161870 A1 | 7/2006 | Hotelling et al. |
| 2006/0190817 A1* | 8/2006 | Banks ............... G06F 3/0481 715/209 |
| 2007/0229471 A1* | 10/2007 | Kim ............... G06F 3/0488 345/173 |
| 2008/0170752 A1* | 7/2008 | Murayama ........... A63F 13/10 382/103 |
| 2009/0055771 A1* | 2/2009 | Nurmi ............... G06F 3/0482 715/810 |
| 2009/0128498 A1 | 5/2009 | Hollemans et al. |
| 2009/0315848 A1 | 12/2009 | Ku et al. |
| 2010/0060599 A1 | 3/2010 | Kwak et al. |
| 2010/0262905 A1* | 10/2010 | Li ................. G06F 3/0482 715/702 |
| 2010/0300771 A1 | 12/2010 | Miyazaki |
| 2011/0074829 A1 | 3/2011 | Lee |
| 2011/0128164 A1 | 6/2011 | Kang et al. |
| 2011/0246877 A1 | 10/2011 | Kwak et al. |
| 2011/0310048 A1 | 12/2011 | B.R. et al. |
| 2011/0320969 A1 | 12/2011 | Hwang et al. |
| 2013/0147770 A1 | 6/2013 | Dahl et al. |

FOREIGN PATENT DOCUMENTS

| | | |
|---|---|---|
| DE | 10042983 A1 | 3/2002 |
| DE | 102005058145 A1 | 6/2007 |
| DE | 102008049636 A1 | 4/2010 |
| EP | 1840717 A1 | 10/2007 |
| EP | 2172837 A2 | 4/2010 |
| JP | 2008535726 A | 9/2008 |
| KR | 100672605 B1 | 1/2007 |
| KR | 20070096040 A | 10/2007 |
| KR | 20100051105 A | 5/2010 |
| KR | 20100124440 A | 11/2010 |
| KR | 20100130474 A | 12/2010 |
| WO | 2005003944 A1 | 1/2005 |
| WO | 2007003464 A1 | 1/2007 |

OTHER PUBLICATIONS

Search Report for International Patent Application No. PCT/EP2012/003336; Feb. 25, 2013.
Office Action for Chinese Patent Application No. 201280040277.6; dated Oct. 17, 2016.
Office Action for Korean Patent Application No. 10-2016-7021660; dated Jun. 8, 2018.

* cited by examiner

METHOD AND DEVICE FOR OPERATING AN ELECTRONIC UNIT AND/OR OTHER APPLICATIONS

PRIORITY CLAIM

This patent application is a U.S. National Phase of International Patent Application No. PCT/EP2012/003336, filed 4 Aug. 2012, which claims priority to German Patent Application No. 10 2011 110 974.2, filed 18 Aug. 2011, the disclosures of which are incorporated herein by reference in their entirety.

SUMMARY

The present disclosure relates to a method for the operator control of at least one electronic device and/or application on a display device, for example in a motor vehicle, in which a plurality of selectable objects are presented. The present disclosure also relates to a device for carrying out this method.

BRIEF DESCRIPTION OF THE DRAWINGS

Illustrative embodiments are explained in more detail below with reference to the appended drawings. The features presented therein and also the features that will be described may be essential to the invention not only in the cited combination but also individually or in other combinations. In the drawings.

DETAILED DESCRIPTION OF THE DISCLOSED EMBODIMENTS

Figure 1:
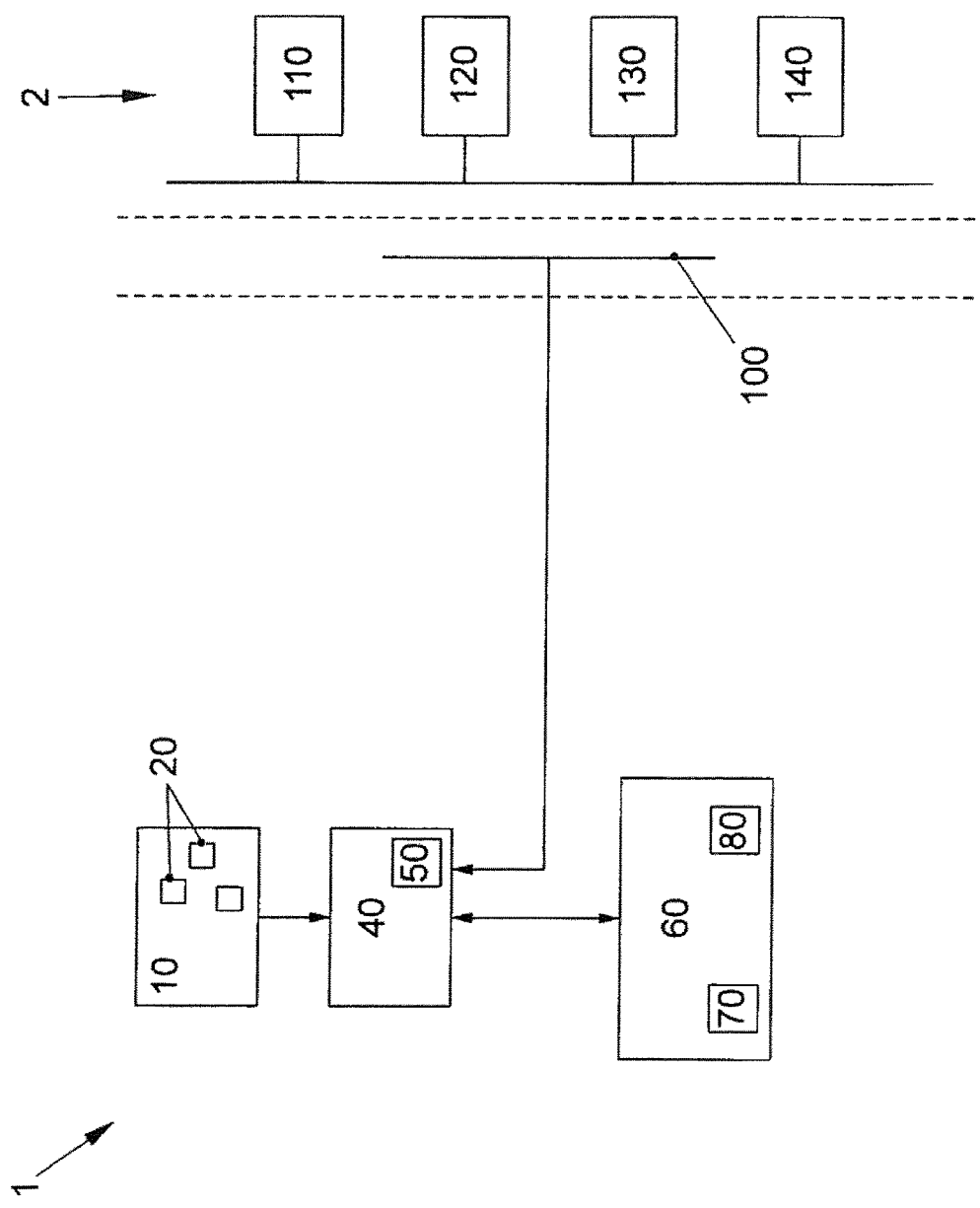
FIG. 1 schematically shows an illustrative embodiment of a device for the operator control of at least one electronic device and/or application.

FIG. 1 schematically shows an illustrative embodiment of a device for the operator control of at least one electronic device 1 and/or application 2. The device comprises a display device 10, a processing device 40, a control device for gesture and handwriting recognition 50, a memory 60, a tag memory 70 and an attribute memory 80. The display device 10 comprises both a display panel for displaying variable graphical objects 20 and a user interface, arranged above the display panel, for the input of commands by a user. A command may be encircling of presented objects 20 by means of a gesture or input of alphanumeric characters by handwriting.

The display device 10 is connected to the processing device 40 by means of the data line, wherein the processing device 40 processes the data for actuating the display panel of the display device 10. The data line is also used to transmit control data for the input commands from the display device 10 to the processing device 40. The processing device 40 comprises a control device for gesture and handwriting recognition 50. The processing device 40 uses a control device for gesture and handwriting recognition 50 to process and analyze the data from the commands that are input by means of the display device 10.

The memory 60 is connected to the processing device 40 by means of data lines. The memory 60 may store various information from the available electronic devices 1 and/or applications 2, for example from the navigation system 120, the audio and video playback device 140 or the telephone device 130. In addition, the processing device 40 has the control device for gesture and handwriting recognition 50, which, in particular, analyzes and processes inputs from a user and, on the basis thereof, initiates actions, for example carries out the filtering and sorting of the presented objects 20 on the display device 10 of the vehicle.

The memory 60 also comprises a tag memory 70 that can store tags, for example genre or year. Each permitted or valid tag can be used to carry out filtering and/or sorting of the objects 20 from the electronic devices 1 and/or applications 2, e.g. the audio and video playback device 140. The memory 60 also comprises an attribute memory 80 that stores attributes, for example letters of the alphabet. The permitted or valid attribute can be used to carry out filtering and sorting of objects 20 from the connected electronic devices 1 and/or applications 2, e.g. from the navigation system 120, on the display device 10. The tag memory 70 and attribute memory 80 are connected to the processing device 40 by the memory 60 by means of a data line. The processing device 40 processes and analyzes the tags or attributes selected on the display device 10 and initiates actions on the basis thereof Above the latter, the applications 2 in the illustrative embodiment comprise a radio 110, navigation system 120, telephone 130 and audio and video playback device 140, which are connected to the processing device 60 of the electronic device 1 by means of a CAN bus 100.

Figure 2:
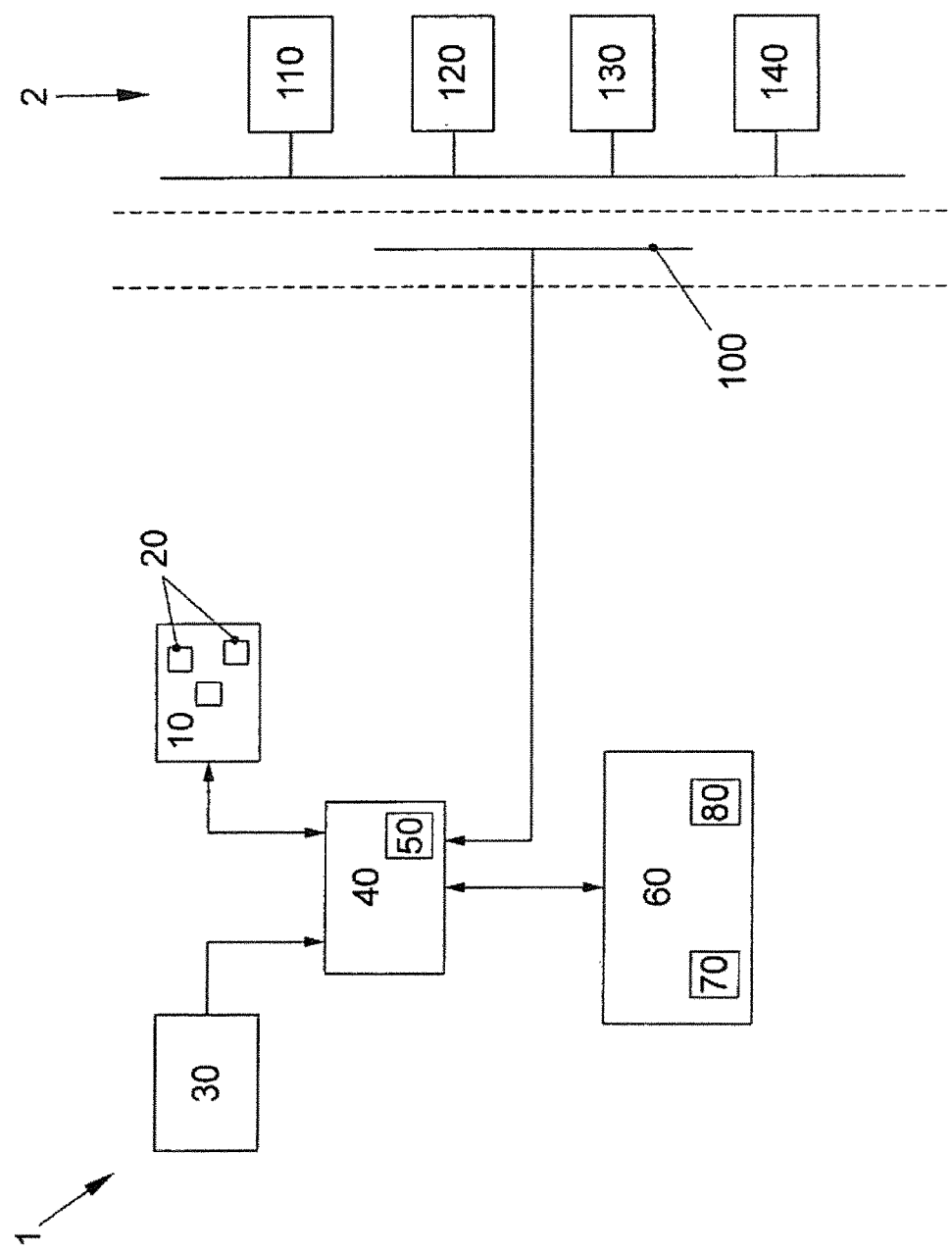
FIG. 2 schematically shows another illustrative embodiment of a device for the operator control of at least one electronic device and/or application.

FIG. 2 schematically shows a further illustrative embodiment with a device 1 for the operator control of at least one electronic device 1 and/or application 2. The device comprises a display device 10, a touchpad 30, a processing device 40, a control device for gesture and handwriting recognition 50, a memory 60, a tag memory 70 and an attribute memory 80. The display device 10 comprises both a display panel for displaying variable graphical objects 20 and a user interface, arranged above the display panel, for the input of commands by a user. The touchpad 30 is a touch-sensitive surface for the input of commands by a user, and the input command is presented on the display device 10.

The display device 10 and the touchpad 30 are connected to the processing device 40 by means of the data lines, wherein the processing device 40 processes the data to actuate the display panel of a display device 10 and to actuate the touchpad 30. The data lines are also used to transmit control data for the input commands from a display device 10 and/or touchpad 30 to the processing device 40. The processing device 40 comprise a control device for gesture and handwriting recognition 50. The processing device 40 uses a control device for gesture and handwriting recognition 50 to process and analyze the data from the commands that are input by means of a display device 10 and/or touchpad 30. In at least one disclosed embodiment, it is conceivable for the touchpad 30 to be directly connected to the display device 10 by means of a data line.

Figure 3:
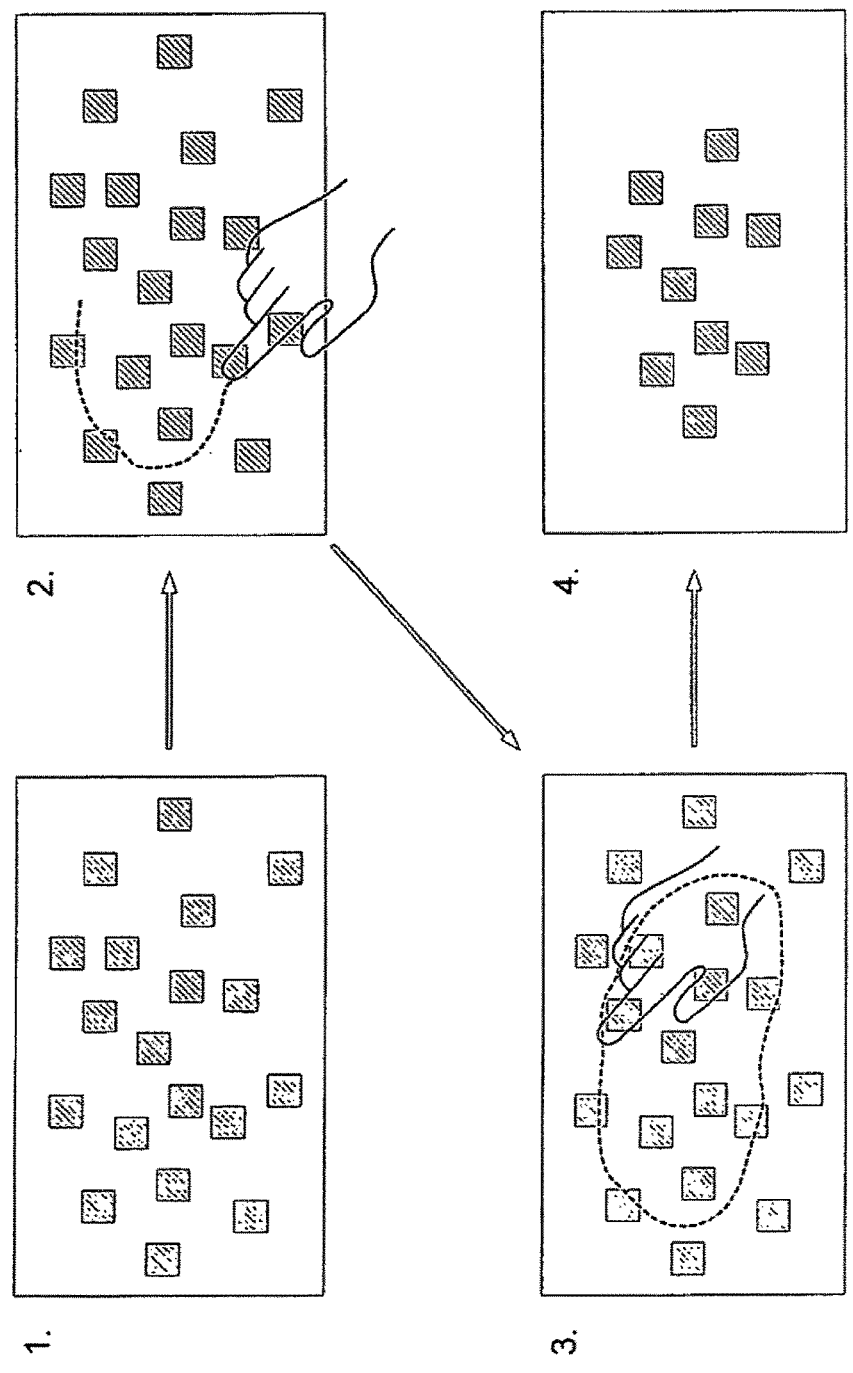
FIG. 3 shows an illustrative embodiment of a method for selecting objects with a finger gesture.

FIG. 3 shows an illustrative embodiment of an electronic device on a display device 10 for the selection of objects 20 with a finger gesture. An operator can encircle the desired objects 20 from a set on the display device 10 and then only the encircled objects 20 are now presented.

Figure 4:
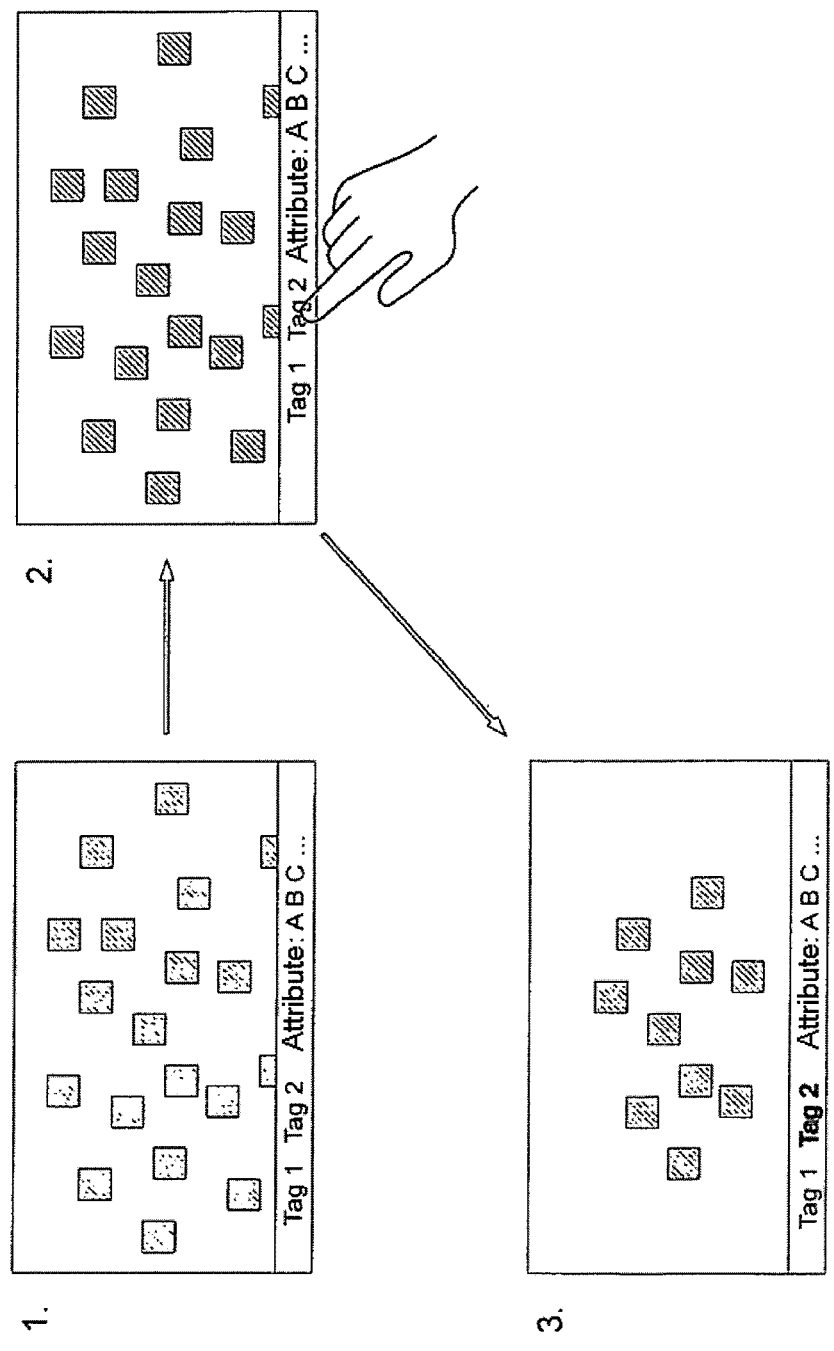
FIG. 4 shows an illustrative embodiment of a method for selecting objects with attributes or tags.

FIG. 4 shows an illustrative embodiment of an electronic device on a display device 10 for the selection of objects 20 with tags or attributes. The operator can select a tag, for example tag 2, on the display device 10. Only the objects 20 that are associated with this tag are presented.

Figure 5:
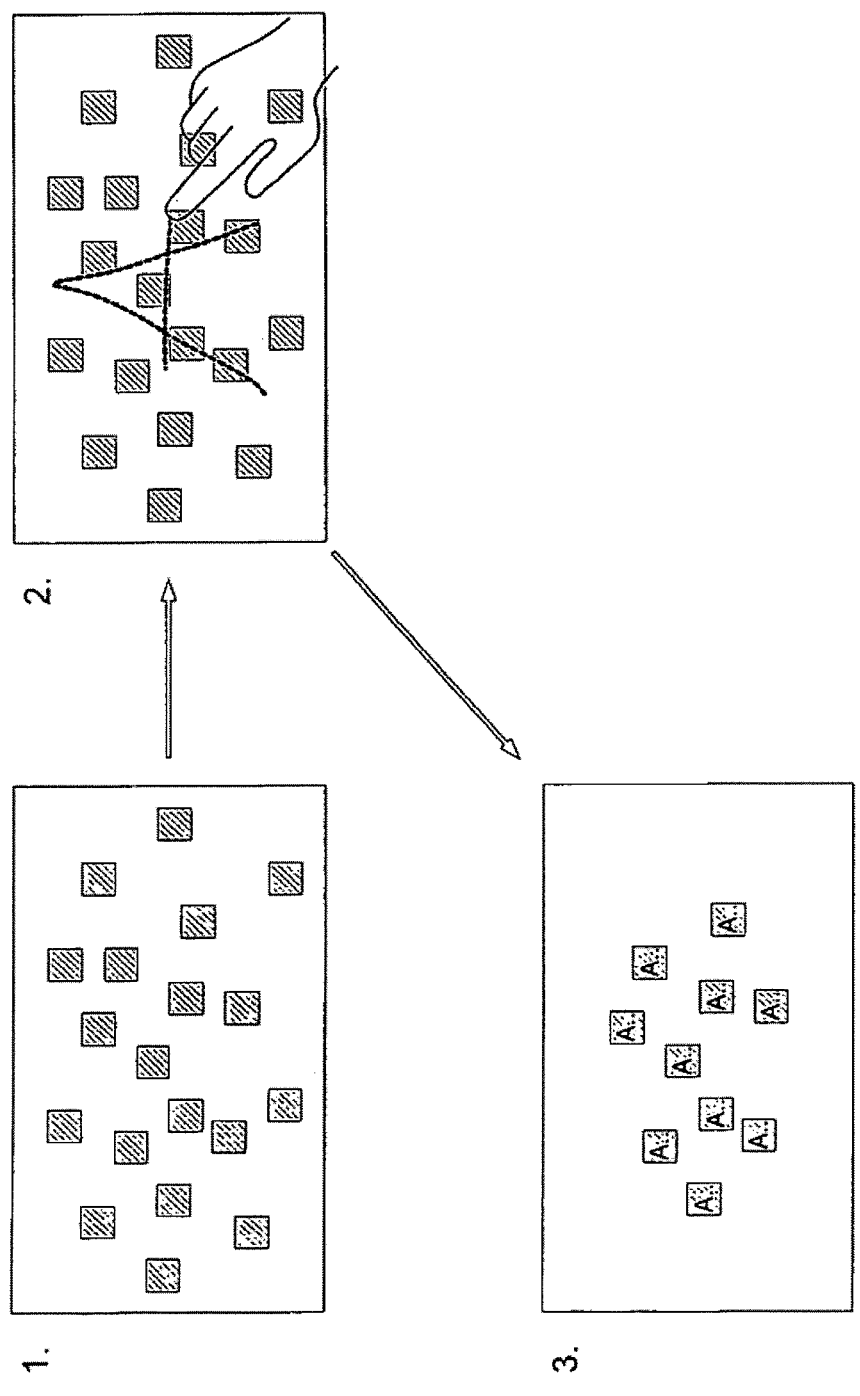
FIG. 5 shows an illustrative embodiment of a method by means of input of alphanumeric characters "A" by handwriting.

FIG. 5 shows another illustrative embodiment, wherein input of alphanumeric characters "A" by handwriting on the display device 10 is recorded. For each permitted legend, e.g. "A", the objects 20 that start with the letter "A" are filtered and presented on the display device 10. In this case, it is also possible to use letter combinations from the letter/number combinations.

Various operator control devices are known that comprise a display device. By way of example, display devices are known that have a touch-sensitive surface. Such display devices are called "touchscreens". Another type of touch-sensitive surface is called touchpads. It is furthermore known that such display devices are used for the operator control of a plurality of selectable objects from applications or application devices, for example, objects from navigation systems, audio or video playback for media data or telephone devices.

WO 2007/003464 A1 discloses a method for selecting a descriptor from a multiplicity of descriptors stored by a storage element by means of handwritten inputs. DE 100 42 983 B4 and DE 10 2008 049 636 A1 discloses methods for inputting alphanumeric characters into a navigation system to determine a destination. A disadvantage of these solutions is that the data are stored and presented in a list, that is to say that many functions are partly concealed in submenus. In this case, a plurality of interaction steps are required for function selection on account of the small space on the graphical display panel.

Illustrative embodiments provide a method and a device of the type cited at the outset that provides the user, for example a driver of a motor vehicle, with the opportunity to select objects presented on a display device for an electronic device and/or application easily and intuitively.

According to at least one disclosed embodiment of the method, the objects are presented spatially in a two-dimensional landscape and are sorted and/or filtered intuitively. A two-dimensional landscape is a two-dimensional presentation of objects, optionally of image objects on a display panel.

The advantages obtained with the invention are particularly that the presentation, sorting and filtering results in direct interaction with the visible objects on the display panel. In addition, direct interaction with the presented objects has the advantage that all objects that are necessary for the desired selection are presented recognizably on the display panel and can be manipulated using simple, intuitive gestures. In addition, this method affords fast and manually easily customizable access to functions in comparison with the use of submenus and key-controlled designs. In this case, the objects are selected quickly and any time using a simple filter method in just one step.

A filter method is preselection of the objects with a gesture on the display device. The objects presented on the display panel are encircled with a pinch gesture for preselection. A pinch gesture is a zoom gesture, for example using thumb and index finger, that expands or reduces the radius of the selection. As a further solution, the preselection of the objects is executed by marking an area on the display device, particularly corners or points of intersection of an area.

In accordance with another disclosed embodiment of the method, the filtering and sorting of the objects is executed with a selection of attributes or tags. By way of example, attributes may be letters of the alphabet, for example to separate objects having a particular initial letter. Tags in a media context may be genre or year, for example, which can be used to filter and sort objects.

In accordance with yet another disclosed embodiment of the method, the objects presented on the display device can be filtered and sorted by means of the input of alphanumeric characters by handwriting on a touchscreen, arranged above the display device, or a touchpad, arranged separately from the display device. In this context, by way of example, a character or a character string is designed as a particular search criterion for the selection of a desired set of objects on the touch-sensitive surface.

The device for carrying out one of the methods has a processing device that is designed such that the selectable objects are being or are presented spatially in a two-dimensional landscape on the display device and are sortable and/or filterable intuitively.

The device is particularly set up such that the processing device is designed such that the selectable objects are filterable or selectable with a pinch gesture or by marking an area on the display device, particularly corners of an area.

In accordance with another disclosed embodiment, the processing device is designed to perform the filtering and sorting of the objects with a selection of attributes or tags. In another disclosed embodiment, the processing device also recognizes the filtering and sorting of the objects by means of the input of alphanumeric characters by handwriting on a touchscreen, arranged above the display device, or a touchpad, arranged separately from the display device.

The device is particularly designed to execute the above-described method completely or partly. In at least one disclosed embodiment of the device, attributes, tags and alphanumeric characters are stored in a memory that is associated with the relevant electronic device/application.

LIST OF REFERENCE SYMBOLS

1 Electronic device
2 Applications
10 Display device
20 Objects
30 Touchpad
40 Processing device
50 Control device for gesture and handwriting recognition
60 Memory
70 Tag memory
80 Attribute memory
100 CAN bus
110 Radio
120 Navigation system
130 Telephone
140 Audio and video playback device

The invention claimed is:

1. A method for control of at least one electronic device and/or application on a display device of a motor vehicle by a motor vehicle operator, in which a plurality of selectable objects are displayed, the method comprising:
displaying the selectable objects spatially in a two-dimensional landscape on the motor vehicle display device so as to be askew relative to one another within orthogonal axes within the two-dimensional landscape; and
automatically filtering the selectable objects in response to and based on a selection of attributes or tags from a list of attributes or tags associated with the selectable objects displayed on the display device, wherein the list of attributes or tags is separate from the selectable objects spatially in the two-dimensional landscape on the motor vehicle display device, wherein the automatically filtering of the displayed, selectable objects further comprises displaying a subset of the displayed, selectable objects based on the selection of attributes or tags, wherein the automatically filtering performed in response to the selection of attributes or tags facilitates direct interaction of the motor vehicle operator with the displayed, selectable objects, wherein the displayed, selectable objects are automatically sorted and displayed based on the selection of attributes or tags, and wherein selection of any or all of the displayed, selectable objects is performed based on the selection of attributes or tags to filter and sort the displayed, selectable objects in a single step.

2. A method for control of at least one electronic device and/or application on a display device of a motor vehicle by a motor vehicle operator, in which a plurality of selectable objects are displayed, the method comprising:

displaying the selectable objects spatially in a two-dimensional landscape on the motor vehicle display device so as to be askew relative to one another within orthogonal axes within the two-dimensional landscape; and automatically filtering the displayed, selectable objects in response to input of alphanumeric characters by handwriting on a touchscreen, arranged above the display device, or a touchpad, arranged separately from the display device, wherein the automatic filtering of the displayed, selectable objects is executed based on the input of the alphanumeric characters, wherein the automatically filtering of the displayed, selectable objects further comprises displaying a subset of the displayed, selectable objects based on the input of the alphanumeric characters, wherein the automatically filtering performed in response to the input of the alphanumeric characters facilitates direct interaction of the motor vehicle operator with the displayed, selectable objects, wherein the displayed, selectable objects are automatically sorted and displayed based on the input of alphanumeric characters, and wherein selection of any or all of the displayed, selectable objects is performed based on the input of the alphanumeric characters to filter and sorted the displayed, selectable objects in a single step.

3. A device for control of at least one electronic device and/or application on a display device of a motor vehicle by a motor vehicle operator, in which a plurality of selectable objects are presented, the device comprising:

a processing device designed such that the selectable objects are displayed on the display device spatially in a two-dimensional landscape so as to be askew relative to one another within orthogonal axes within the two-dimensional landscape, wherein the plurality of displayed, selectable objects are automatically filterable in response to and based on a selection of attributes or tags from a list of attributes or tags associated with the selectable objects displayed on the display device separate from the selectable objects displayed spatially in the two-dimensional landscape, wherein the automatically filtering performed in response to the selection of attributes or tags facilitates direct interaction of the motor vehicle operator with the displayed, selectable objects, wherein the displayed, selectable objects are automatically sorted and displayed based on the selection of attributes or tags, and wherein selection of any or all of the displayed, selectable objects is performed based on the selection of attributes or tags to filter and sort the displayed, selectable objects in a single step.

4. A device for control of at least one electronic device and/or application on a display device of a motor vehicle by a motor vehicle operator, in which a plurality of selectable objects are presented, the device comprising:

a processing device designed such that the selectable objects are displayed on the display device spatially in a two-dimensional landscape so as to be askew relative to one another within orthogonal axes within the two-dimensional landscape, wherein the plurality of selectable objects are automatically filterable in response to and based on input of alphanumeric characters by handwriting on a touchscreen, arranged above the display device, or a touchpad, arranged separately from the display device, wherein the automatically filtering performed in response to the input alphanumeric characters facilitates direct interaction of the motor vehicle operator with the displayed, selectable objects, wherein the displayed, selectable objects are automatically sorted and displayed based on the input of alphanumeric characters, and wherein selection of any or all of the displayed, selectable objects is performed based on the input alphanumeric characters to filter and sort the displayed, selecttable objects in a single step.

5. A motor vehicle having a device for the operator control of at least one electronic device and/or application as claimed in claim 3.

6. A method for control of at least one electronic device and/or application on a display device of a motor vehicle by an motor vehicle operator, in which a plurality of selectable objects are presented, the method comprising:

presenting the objects spatially in a two-dimensional landscape on the motor vehicle display device; and automatically filtering the presented objects in response to a preselection gesture in front of or on the motor vehicle display device, wherein the gesture comprises a pinch gesture and the presented objects are encircled with the pinch gesture for preselection, wherein the pinch gesture comprises a zoom gesture that expands or reduces the radius of selection and marks an area on the motor vehicle display device, and wherein the presented objects encircled within the area on the motor vehicle display device are executed, wherein the automatically filtering performed in response to the preselection gesture facilitates direct interaction of the motor vehicle operator with the presented objects, wherein the selectable objects are automatically sorted and displayed based on the preselection gesture, and wherein selection of any or all of the displayed objects is performed based on the preselection gesture to filter and sort the displayed objects in a single step.

7. A device for control of at least one electronic device and/or application on a display device of a motor vehicle by a motor vehicle operator, on which a plurality of selectable objects are presented, the device comprising:
    a processing device designed such that the selectable objects are presented spatially in a two-dimensional landscape on the motor vehicle display device and are automatically filterable by a preselection gesture in front of or on the motor vehicle display device,
    wherein the gesture comprises a pinch gesture and the presented objects are encircled with the pinch gesture for preselection,
    wherein the pinch gesture comprises a zoom gesture that expands or reduces the radius of selection and marks an area on the motor vehicle display device,
    wherein the presented objects encircled within the area on the display device are executed,
    wherein the automatically filtering performed in response to the preselection gesture facilitates direct interaction of the motor vehicle operator with the presented objects,
    wherein the objects are automatically sorted and displayed based on the gesture, and
    wherein selection of any or all of the displayed objects is performed based on the preselection gesture to filter and sort the displayed objects in a single step.

8. A motor vehicle having a device for the operator control of at least one electronic device and/or application as claimed in claim 4.

9. A motor vehicle having a device for the operator control of at least one electronic device and/or application as claimed in claim 7.

* * * * *